United States Patent [19]
Feldman

[11] Patent Number: 6,163,616
[45] Date of Patent: *Dec. 19, 2000

[54] SYSTEM AND METHOD FOR VERIFYING THE IDENTITY OF A PERSON

[76] Inventor: Stephen E. Feldman, 301 E. 63rd St., New York, N.Y. 10021-7721

[*] Notice: This patent is subject to a terminal disclaimer.

[21] Appl. No.: 09/066,148

[22] Filed: Apr. 24, 1998

Related U.S. Application Data

[63] Continuation-in-part of application No. 08/581,435, Dec. 29, 1995, Pat. No. 5,745,591.

[51] Int. Cl.$^7$ ............................................. G06K 9/00
[52] U.S. Cl. ........................................ 382/115; 340/825.34
[58] Field of Search ........................... 382/115, 119, 382/120, 121, 123; 340/825.34

[56] References Cited

U.S. PATENT DOCUMENTS

| | | |
|---|---|---|
| 3,576,537 | 4/1971 | Ernst . |
| 3,581,282 | 5/1971 | Altman . |
| 3,648,240 | 3/1972 | Jacoby et al. . |
| 4,032,889 | 6/1977 | Nassimbene . |
| 4,495,644 | 1/1985 | Parks et al. . |
| 4,669,487 | 6/1987 | Frieling . |
| 4,710,760 | 12/1987 | Kasday . |
| 4,720,869 | 1/1988 | Wadia . |
| 4,736,203 | 4/1988 | Sidlauskas . |
| 4,752,965 | 6/1988 | Dunkley . |
| 4,856,077 | 8/1989 | Rothfjell . |
| 5,018,208 | 5/1991 | Gladstone . |
| 5,022,086 | 6/1991 | Crane et al. . |
| 5,027,414 | 6/1991 | Hilton . |
| 5,045,644 | 9/1991 | Dunthorn . |
| 5,103,486 | 4/1992 | Grippi . |
| 5,150,420 | 9/1992 | Haraguchi . |
| 5,229,764 | 7/1993 | Matchett et al. . |
| 5,347,589 | 9/1994 | Meeks et al. . |
| 5,479,528 | 12/1995 | Speeter . |
| 5,483,601 | 1/1996 | Faulkner . |
| 5,548,660 | 8/1996 | Lemelson . |
| 5,559,504 | 9/1996 | Itsumi et al. . |
| 5,594,806 | 1/1997 | Colbert . |
| 5,675,362 | 10/1997 | Clough et al. . |
| 5,745,591 | 4/1998 | Feldman .................... 382/115 |

*Primary Examiner*—Bhavesh Mehta
*Attorney, Agent, or Firm*—Kenneth E. Merklen; Stephen E. Feldman

[57] ABSTRACT

A system and method for verifying the identity of a person while the person is performing a seemingly unrelated act. The position of a person's hand in contact with a sensing surface, while holding an object and/or performing a task, such as using a writing instrument to write one's signature or a computer mouse in association with a computer, for example, is distinctive and consistent and will serve to verify the identity of a person, when data defining such contact is compared with a standard defined by previously determined data from the same person. Sensing devices, such as pressure or electrical transducers or other sensors can be located in or on a sensing surface to determine the parameters of contact between the person's hand and the sensing surface. Alternatively, a touch-sensitive screen, such as used in conjunction with a computer, may be used for sensing a person's hand contact.

12 Claims, 3 Drawing Sheets

SYSTEM AND METHOD FOR VERIFYING THE IDENTITY OF A PERSON

This patent application is a Continuation-in-Part of a U.S. patent application Ser. No. 08/581,435, filed Dec. 29, 1995 titled, A System And Method For Verifying The Identity Of A Person, now U.S. Pat. No. 5,745,591.

BACKGROUND OF THE INVENTION

1. Field of the Invention

The present invention relates to methods and apparatus for verifying the identity of a person, without informing the person that verification of the person's identity is being performed.

2. Prior Art

There are well known methods and techniques used to verify the identity of a person. A popular method is the comparison of the face of a person with a reliable photograph, for example, a photograph on one's driver's license. One problem with this form of verification is that driver's licenses, complete with photograph, can be falsified. This is also true with passports and passport photographs.

Another method and apparatus for identification verification include the taking and comparing of finger prints, while more sophisticated methods and apparatus verify persons by voice patterns and also by distinctive patterns in the retina of the eye. The former verification method is widely used by law enforcement organizations. It provides strong verification but it is dirty, requiring the use of finger print ink, and an experienced finger print taking person for making an acceptable finger print on a form. The latter two methods require very sophisticated and expensive apparatus and, in all of the above methods, the person whose identity is being verified or challenged, is aware that his or her identification is being challenged.

It has been found that the hands of individuals are distinctive. Some U.S. patent that teach scanning the physical dimensions of the human hand for identification verification include the patents:

| | | |
|---|---|---|
| 3,576,537 | to Ernst | 1971 |
| 3,648,240 | to Jacoby et al | 1972 |
| 4,669,487 | to Frieling | 1987 |
| 4,720,869 | to Wadia | 1988 |
| 4,736,203 | to Sidlauskas | 1988 |

Generally, the teachings of the Ernst patent; the Jacoby et al patent and the Wadia patent relate to two dimensional scanning of the hand where the hand is placed on a scanning plate which performs the scanning. The teaching in the Sidlauskas patent covers three dimensional scanning whilet the patent to Frieling teaches apparatus for sensing the thickness and longitudinal distance between adjacent knuckles of the finger of the hand. In each of these teachings it is inherent that the person whose identification is being verified, is acutely aware that his identity is being challenged.

The U.S. Pat. No. :

| | | |
|---|---|---|
| 4,732,965 | to Dunkley et al | 1988 |
| 4,856,077 | to Rothfjell | 1989 |

-continued

| | | |
|---|---|---|
| 5,150,420 | to Haraguchi | 1992 |
| 5,347,589 | to Meeks et al | 1994 | relate to verifying a person's identification through a hand written signature or hand writing comparison.

U.S. Pat. No. 4,495,644 to Parks et al, in 1985 teaches using other characteristics relating to one's handwriting, rather than handwriting itself, for a personal verification. Gladstone, in his U.S. Pat. No. 5,018,208, issued in 1991 teaches the use of a pressure detection device incorporated into a writing instrument, which relates to the pressure applied by the writer, through the writing device, when writing with the writing device.

Basically, all the above cited prior art require some degree of conscious cooperation on the part of the person whose identification is being challenged. It is often undesirable and sometimes embarrassing to ask a person to engage in an act that has an objective of challenging a person's identification. The present invention overcomes the undesirable aspect of challenging one's identity by accomplishing the challenging act surreptitiously, while the person is performing a normally required act.

SUMMARY OF THE INVENTION

It has been determined that each person grasps a writing instrument in a distinctive manner. This is apparent when the Gladstone (U.S. Pat. No. 5,018,208) teaching is considered. However, we have also determined that each person, when writing with a writing instrument, rests the hand holding a writing instrument, on a surface in a distinctive manner. For example, when writing a signature using a writing instrument, the side of the hand used to write the signature, including the heel of the hand and the side of the hand extending to the base of the small finger (the pinky), plus the small finger itself, form a distinctive pattern against the surface on which the hand rests. This pattern, with relation to the impression point of the writing instrument used, is so individual and consistent that a person's identity may be verified by comparing a previously taken pattern of such person, with a second or current pattern, taken from the same person.

The advantages of using the novel methods of the present invention to verify the identity of a person become apparent when one considers how the pattern used for comparison is obtained. The person, whose identity is to be verified, is requested to perform a normal act, that is, to sign a receipt. The sheet on which the receipt is printed is positioned on a plate through which the desired pattern is detected. The signing of a receipt is a normal, and often necessary act and the detection of the pattern of the person's hand as the hand contacts the support plate, during writing a signature on the receipt is accomplished virtually without the knowledge of the person signing the name.

Likewise, we have also determined that a distinctive and consistent pattern of hand contact is obtained, when a person grasps and operates a computer mouse, the hand contact being made between the hand and the computer mouse and the hand and the surface over which the computer mouse is moved. The pattern is made by the hand holding and operating the computer mouse, as parts of the hand grip the computer mouse and, at the same time, make contact with the surface over which the mouse is moved. Because of the wide use and familiarity of computers, it would not be unreasonable or unusual to have a person operate a computer mouse during a business procedure. While a person is operating a computer mouse, the plate over which the computer mouse is moved may cover a pattern detection means and the pattern formed by the hand parts and fingers of the person holding and operating the mouse over the plate, may be detected, virtually without the knowledge of the person using and/or moving the computer mouse.

If a person is not told that the pattern looked for is being monitored and/or detected, there is no reason to affect an otherwise normal or natural stance when signing one's name or using and/or moving a computer mouse over a surface.

The novel patterns discussed above can be obtained using any of several techniques; optically, by use of a sensitive film and camera positioned under the contact surface; photo-electrically, using light emitting elements and photo detectors in or under the contact surface and detecting reflected light; electrically, by using an array or matrix of switches mounted in or on the under surface of the contact plate or surface; or, by use of pressure sensitive elements, such as resistive transducers, mounted in or on the underside of the contact surface.

Patterns obtained for identification verification can be compared with previously taken patterns of the principal person. Comparison may be made using pattern recognition systems or techniques or a mathematical algorithm in which alpha-numeric data defining angles and/or other parameterized values defining angle by length are compared. The alpha-numeric data identifying the person may be stored on the magnetic strip of the credit card provided to a person. Identification patterns may be obtained while the person using the card is signing a receipt and comparison of the newly acquired alpha-numeric data may be mace with the data stored on the magnetic strip thus verifying the identity of the person using the credit card.

In another aspect of the invention, the present invention provides a computer security device. Using the distinctive and consistent pattern of hand contact with a surface, detectable when a person grasps and operates a computer mouse across such surface, a computer mouse, coupled to a computer, is moved across the surface of a touch-sensitive screen used with the computer, for identification verification. Limited access to the computer may be programmed into the computer for the purpose of confirming the identity of the computer user. The personal distinctive and consistent pattern of hand contact with the surface of a touch-sensitive screen of the computer, made when moving a computer mouse across the surface of the screen, may be used for verification of the identity of the person using the computer. Verification may be made by comparing the current hand contact made with the surface of a touch-sensitive screen, while moving a computer mouse across the screen, with a previously programmed personal hand contact pattern so made by the person whose identity is to be verified. The computer may be programmed so that access, in whole or in part, may be accorded to the computer upon personal verification. Such personal identity verification may be used in lieu of pass words or numbers, which require remembering. An example of a touch-sensitive screen is taught by Kasday in his U.S. Pat. No. 4,710,760, issued Dec. 01, 1987.

DETAILED DESCRIPTION OF THE INVENTION

The invention, from its broadest aspect, provides a method and apparatus for confirming the identity of a person from a personal pattern, derived from the person performing a seemingly unrelated act and virtually without the knowledge of such person. The seemingly unrelated act is the signing of a receipt, which is a normal business practice. The act of signing one's name is performed on a support surface or desk surface or writing surface under which or which is part of a pattern detection means and functions to detect certain personal patterns, detectable while the person is performing the act and unique to the person performing the act, detection being made without the knowledge of the person performing the act. Firstly, the hand which the person uses, when signing his or her name, is quickly detected and determined. Secondly, when holding a writing instrument and writing something on a sheet of paper, for example, such as a signature, for example, part of the hand holding the writing instrument will make contact with the surface used to support the substrate or paper when the signing takes place. This contact with the surface will form a detectable and distinctive pattern which can be compared with a previously obtained pattern detected during a similar activity or act done by the principal or standard person. Comparing two patterns, obtained from first and second acts, will confirm that the person performing the second act is, or is not the same person who performed the first act.

It has been found that when a person signs their name on a paper, for example, and the paper is supported on a flat surface, the heel of the hand holding the writing instrument (the fleshy part of the hand adjacent the metacarple bone and the ulna) and the outside length of the small finger (the pinky) including the first, second and third lateral aspects of the small finger, and portions of the ring and middle fingers contact the flat surface in a manner that is distinctive to each person. Contact by various parts of the hand with the flat surface forms a distinctive pattern. This distinctive pattern and the distinctive manner in which such person holds a writing instrument define characteristics, which are individual and distinctive to such person. The differences in these characteristics are so distinctive that persons with virtually the same size and shape hand are distinguishable, one from the other because of differences in holding a writing instrument or other object, such as a computer mouse, for example, and thereby project a different impression or pattern of such characteristics sensed through a support surface.

These characteristics can be detected and/or measured in numerous way: firstly, the hand, whether the right hand or the left hand, used may be detected; secondly by 1) sensing and measuring the area of contact, 2) the pressure applied to the support surface by the writing instrument and the hand surface, 3) the individual angles of the elements of the hand, that is, the bend of the small finger (pinky) with respect to the bone along the heel of the hand and angle at which the ring and middle finger make contact with the support surface and the angle of the writing instrument relative to the support surface. These characteristics may, when considered cumulatively, be used to confirm the identity of a person whose characteristic are already known.

When practicing the present invention the identity of a person, whose hand position, while writing characteristic have already been established in a memory device, can be confirmed, without the person's knowledge, since such person will be providing a signature, in a normal mariner without realizing the characteristics associated with the position of the hand are being monitored and detected so that a comparison of such characteristics may be made against known characteristics.

A sensitive surface or plate is provided on which a paper or other document is positioned to receive the signature of a person, whose identity is to be confirmed. The sensitive surface or plate may be built into a glass or plastic sheet normally used as a support surface for supporting documents. The sensitive surface may be in the form of an overlay positioned on a support plate or a pad positioned on a support plate. The sensitive surface is defined by a plurality of spaced sensors positioned to establish a grid formation. When the hand grips the writing instrument and is positioned on the sensitive surface in order to sign the document positioned on the sensitive surface, contact by the hand and writing instrument are sensed and interrogated, relative to the sensor grid. A determination of right hand or left hand is made; a pattern of contact between parts of the hand and the support surface is sensed, along with the pressure of the hand parts on the sensitive surface and the position and pressure of the point of the writing instrument on the surface. This data is converted to a common denominator and is compared with similar data, previously obtained, from an individual, the identity of whom is positively known.

The comparison may be done using well known computer techniques and is simplified because the data defining the characteristic are known so that the newly obtained data is compared with already obtained and known data and by comparison, a determination of yes or no can quickly be made.

Figure 1:
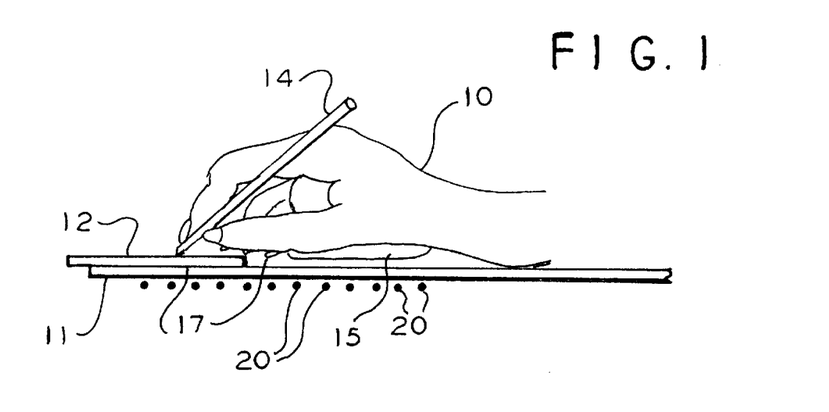
FIG. 1 is a representation, in side elevation view, of a hand of a person writing with a writing instrument with part of the hand in contact with a surface.

As shown in FIG. 1, a sensitive surface 11 is provided on which a sheet or document, 12, such as a receipt, for example, is placed, on which a signature is required. The person whose identity is to be confirmed is requested to sign the document 12. The hand 10 represents the hand of the person signing the document using a writing instrument 14, which may be a normal ball-point pen, for example. The sensitive surface 11 may take one of several forms. One embodiment of the invention provides a sensitive surface or plate in the form of a glass or plastic plate or sheet integrated into the surface of a desk or other writing surface. The glass or plastic plate may be translucent or opaque to visible light but transparent to infrared, ultra-violet and/or other microwave energy, and/or may be pressure sensitive. Sensors may be located in the plate or on the under surface of the plate. Sensors may be located, relative to each other so as to form a grid with centers of ¹⁄₁₆" or less.

Alternatively, the sensitive surface or plate may be in the form of an overlay plate or sheet or a portable document support that may be positioned at any convenient location on a desk, table or support surface. The overlay may be a plastic or rubber sheet with sensors integrated into the sheet and over which a document is positioned so the act of writing on the document is sensed or detected by the sensors integrated into the overlay. The overlay sheet may be flexible or rigid.

The portable document support may be constructed like a receipt/order container-dispenser used in many stores.

As represented in FIG. 1, a plurality of sensors 20 are located on the under surface of the plate 11. The sensors are positioned, relative to each other, so as to define a grid, represented by the lines 22/21, in FIGS. 2 and 3. The accuracy of the invention is defined by the spacing between the centers of the sensors, since the pattern obtained by the sensors is on a sensor-to-sensor basis rather than on a position-on-the-sensitive-surface basis.

Figure 1A:
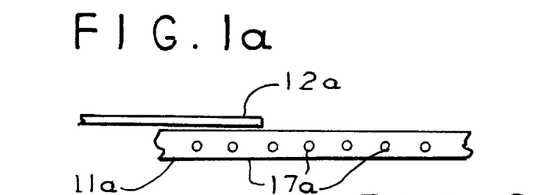
FIG. 1a is a representation, in side elevation view, of an alternate sensitive pad or sheet.

FIG. 1a shows sensors 17a imbedded in the lay over sheet or pad 11a with a document substrate 12a on the lay over sheet or pad.

When practicing the invention any sensor transducers that sense contact or are actuated by proximity of matter or are actuated by reflection, such as pressures sensitive transducers or optical transducers, such as infrared, ultra-violet or light emitting diodes, with corresponding photo detectors may be used for detecting contact and proximity of a person's hand to the contact surface, without limitation thereto. Pressure sensitive transducers may be used for detecting contact with the surface. With optical transducers, a central light emitting element and a plurality of spaced photo diodes may be used.

Sensors can detect and measure contact and/or pressure and a pattern defining such contact and/or pressure from activated sensors is obtained by a multiplexed system with analog to digital conversion, using welt known techniques. The pattern obtained is preferably a three dimensional pattern of the hand although a two dimensional pattern may be used, if desired. The pattern, in digital form, is stored in a computer memory. Subsequent mathematical manipulation of the digital data may be applied to smooth or average the parameters. The data and the averaged data is applied to computer software to compare such pattern with previous pattern or patterns of the original, positively identified person, with whom confirmation is the objective. As discussed below, a touch-sensitive screen, such as used in conjunction with computers, may also be used in lieu of sensor transducer pads.

Figure 2:
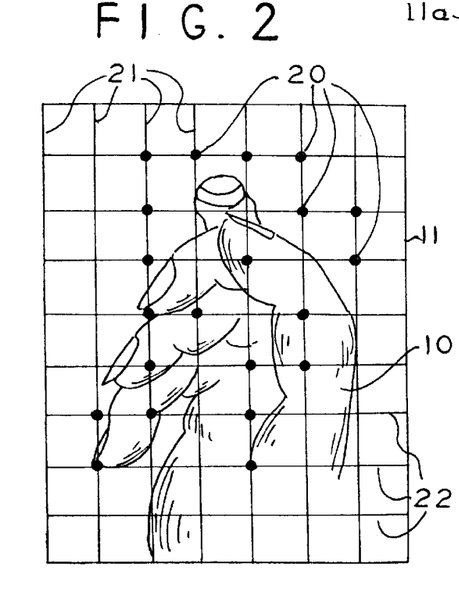
FIG. 2 is a representation of the hand shown in FIG. 1 as viewed from below the surface of contact.
Figure 3:
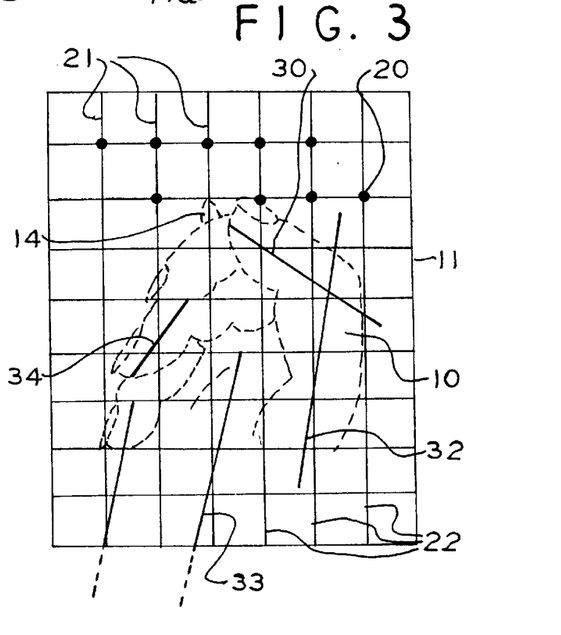
FIG. 3 is a representation of the hand of FIG. 1 shown in FIG. 2 with intersecting lines forming angles of the components indicated.

FIG. 2 shows, in an underview of the sensing or sensitive plate 11, the hand 10 holding a writing instrument 14 with part of the hand (in shaded area) in contact with the upper surface of the sensing or sensitive plate 11. The sensors 20 (not all of which are represented) define a grid-like formation. The sensing devices may be located on the under surface of the sensing plate or may be integrated into the sensing plate in a matrix. FIG. 3 shows the same sensing or sensitive plate 11 in a view corresponding to the view shown in FIG. 2 however, the hand 10 is shown in broken line form and the lines 30–34 represent the position of elements of the hand, and angles formed by these elements, which angles are distinctive and consistent, to the same person.

It has been found that one characteristic is particularly distinctive. This distinctive characteristic is the position and angle formed by lines defining the linear portion of the end bone of the little finger and the length of the heel of the hand, such as formed by the lines 31 and 33 at 35.

Another distinctive, individual characteristic is defined by angles formed by the second and third lateral aspects of the pinky.

Computer techniques are used to store the original data defining the distinctive characteristics of a person, whose identity is known. This original data is used as a standard for use in confirming the identity of that particular person. Subsequent data, defining essentially the same group of characteristics is obtained from a person whose identity is to be confirmed.

The standard data for a person may be stored in a computer, in any type of memory. The standard for a person may also be stored on a credit card and the standard may be read by a reading device associated with the credit card number reader and identity confirmation can be made by a pattern of characteristics sensing and distinguishing system associated with the credit card receipt carrier, on which a person signs the credit card receipt.

The standard data consistent with a person's identity is stored in a computer memory. Subsequent data of the same group of characteristics may be obtained from a second person and compared with the standard data, with the objective of confirming the identity of the second person, relative to the person identified by the standard data.

If a predetermined number of points match when comparison is attempted, such as 90%, or there is 90% agreement in comparing the parameters, conformation that the two persons are the same person is established. If a predetermined number of points do not match, the second person may be asked to perform the signing or identifying act a second time and a second comparison with the standard may be made. If the predetermined comparison standard is not met, confirmation of identity is not established.

Techniques for reading the pattern of characteristics may be done in several ways. Reading the pattern of characteristics may be started by the writing instrument making contact with the sensitive plate or sheet. One reading could be taken or several timed readiness could be taken, or a constant reading may be taken during the time the signature is being made. Preferably, reading the pattern of contact characteristics is started and made when the person signing the paper or receipt, for example, makes contact by the writing instrument with the sensing or sensitive plate or sheet.

The pattern of contact characteristics may be slightly different when a person providing a signature is standing as opposed to sitting. Thus, different standards may be taken and used for the same person.

An original standard for a person may be obtained, with or without the person's knowledge. There is no need for a special procedure although an institution, such as a bank, for example, may want customers to be aware that the security used by the bank includes involuntary security checks, such as the present invention. An original standard may be obtained, without a special procedure, when a person first uses a particular credit card, signing his name on a credit card receipt. In the latter instance, there will not be a standard with which the pattern may be compared. However, non-procedural security checks can be carried out subsequently, using the standard obtained from the first use signature for that particular credit card.

Figure 4:
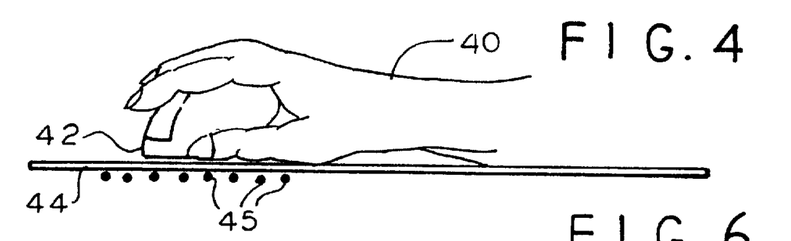
FIG. 4 is a representation, in side elevation view, of a hand holding a computer mouse, showing the area of contact against a surface.

Although preferably the practices of the invention is accomplished during the act of writing a signature, for example, FIG. 4 represents another embodiment of the invention. A hand 40 of a person is represented holding and/or operating a computer mouse 42 on a surface 44. A plurality of spaced sensors 45 are positioned, in a grid or other geometric pattern on the underside of the plate 44. Although a 90 degree grid pattern for the sensing elements is represented and preferred, a circular pattern of sensors may be used, with a centrally located sensor and additional sensors spaced radially from the centrally located sensor and arcuately from each other.

Figure 5:
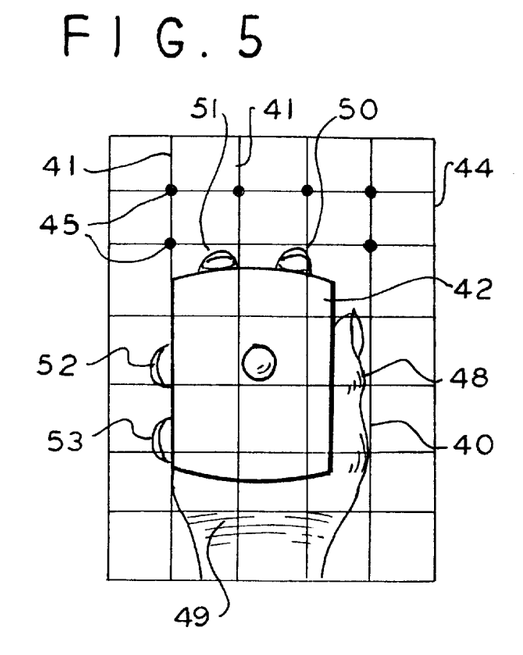
FIG. 5 is a representation of the hand shown in FIG. 4, viewed from below the surface.

FIG. 5 represents a view of the hand 40 holding the mouse 42 of FIG. 4, the view from the underside of the plate 44, looking up. The grid lines 41, have sensor devices at intersections. The dots 45, represent the sensor devices positioned at the intersections of the grid lines, 41 with preferred spacing of $\frac{1}{16}$" between grid lines. As seen from below, the thumb 48 and heel 49 of the hand 40 form a distinctive spacing pattern, along with the spacing of the finger tips 50–53.

Figure 6:
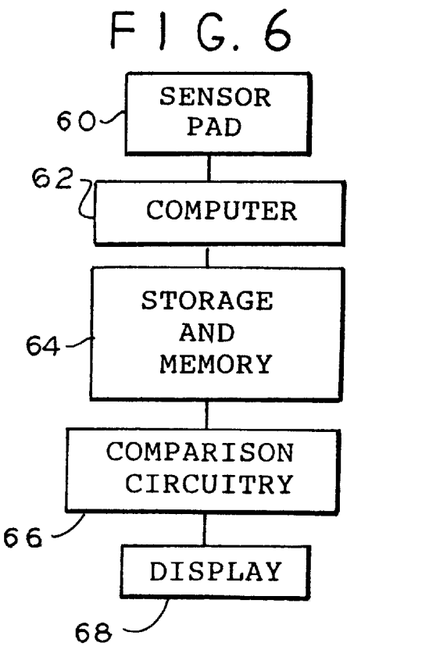
FIG. 6 is a block diagram of one embodiment of the invention.

FIG. 6 is a block diagram of a system or apparatus that my be used in practicing the invention. A sensor pad or sheet of a sensitive plate 60 provides detection signals from which a pattern of characteristics of contact is generated. The sensor or detection signals are input into a computer 62 which converts the signals into digital data. The data is stored in a memory 64, as a standard for a particular person. If there is already stored therein a standard for a person, and the current reading is a second or more reading, the standard may be retrieved from storage and input into the comparison circuitry 66 and the second or more reading may be compared with the standard in the comparison circuitry 66. The results of the comparison may be displayed on the display or monitor 68.

Figure 7:
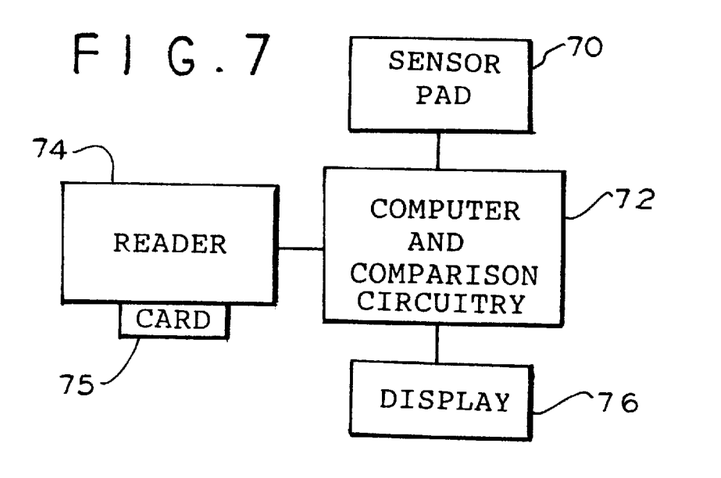
FIG. 7 is a block diagram of another embodiment of the invention.

FIG. 7 represents, in block diagram form, an alternate embodiment of the invention. The sensor pad 70 corresponds to the sensor pad 60 in FIG. 6. The computer and comparison circuitry 72 corresponds functionally to the computer, 62, storage and memory, 64 and comparison circuitry, 66 of FIG. 6, however, the embodiment represented in FIG. 7, includes a do reader device 74 which accepts and reads a card 75, or other transferrable, programmable memory means or data storing element, on which is programmed or stored data corresponding to or defining a personal standard for a person against which comparison is made. The card 75 is programmable, transferrable and interchangeable between reader devices. The reader device 74, represents an interface device for accepting and reading a transferrable, programmable memory device, such as a card or chip or other portable programmable mermory element. The card, 75, represents a transferrable, portable, programmable memory or storage element, such as a card, chip, tape or other storage element accepted by the reader device 74 and read by the reader. The reader device 74, reads the data implanted or programmed onto the card 75 and inputs data, stored on the card, into the comparison circuitry.

Figure 8:
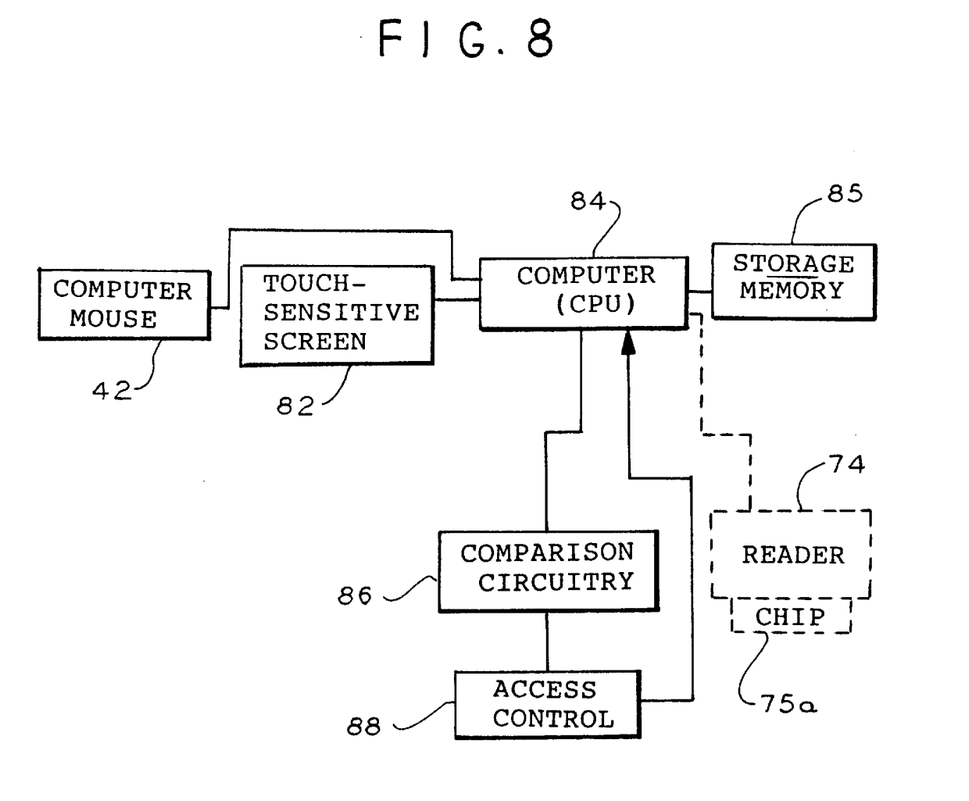
FIG. 8 is a block diagram of still another embodiment of the invention.

FIG. 8 represents still another embodiment of the invention, in block diagram form. A touch-sensitive screen 82, an example of which is found in U.S. Pat. No. 4,710,760, is provided, in conjunction with a computer (CPU), 84. A computer mouse 42 is used by the person whose identity is to be verified and, holding the computer mouse in his hand, he (or she) operates the computer mouse across the sensitive surface of the touch-sensitive screen. The touch-sensitive screen, 82, detects the anatomical pattern of the hand holding the computer mouse and making contact with the surface of the touch-sensitive screen. The storage/memory 85 may correspond to the storage and memory 64 or may be a conventional storage and memory element for the computer 84. The storage/memory 85 may be used to store a standard for use by the comparison circuitry, 86, or, alternatively, a reader device 74, shown in broken line form, may be provided to input data defining a standard for a person into the computer (CPU), 84. A chip 75a, insertable into the reader device 74, is programmed with the standard for a person, used for comparison. The comparison circuitry 86 corresponds to the comparison circuitry 66. The computer 84 may be programmed to permit limited access to the computer upon turn-on, for the purpose of confirming the identity of the intending user. This functions as a security measure for the computer, and limits access to the computer to those persons entitled to access. The security measure may also be used to control the degree of access accorded a potential user of the computer. When satisfactory identification of a person is confirmed, access to the computer, in whole or in part, may be accorded through the use of an the access control, 88.

The touch-sensitive screen may be horizontally oriented or vertically oriented, as desired. Although the embodiment represented in FIG. 8 has great utility when used for computer security, limitation to such use is not implied or intended.

Several advantages are accomplished practicing the invention embodied in FIG. 8. Security of the computer is enhanced. Degrees of access to the computer become personalized. The standard of a person may be programmed into or placed on an insertable card, chip or other transferrable means making a more versatile identity confirmation system. Further, storing a standard of a person and not kept in the computer itself where theft of a standard is possible by one accessing the computer.

In the foregoing description of the invention, referenced to the drawings, certain terms have been used for conciseness, clarity and comprehension; however, no unnecessary limitations are to be implied from or because of the terms used, beyond the requirements of the prior art, because such terms are used for descriptive purposes and are intended to be broadly construed. Furthermore, the description and illustration of the invention is not limited to the exact details shown, represented or described.

Thus, here has been shown and described a preferred embodiment of a system and apparatus for verifying the identity of a person when a person performs an act, such as writing with a writing instrument on a sensitive surface, pad or sheet. In addition, the invention has also been described in an alternate arrangement where the identity of a person is confirmed when the person performs an alternate act, such as, using a computer mouse. In each case a pattern of contact between the hand and a surface, which is distinctive and consistent, is obtained and the pattern may be compared with a previously obtained standard to verify the identity of the person performing the second, like act. Other combinations of apparatus or components have been suggested, along with some modifications. Other changes and/or modifications may be made by those skilled in the art without departing from the scope of the invention as set forth in the appended claims.

What is claimed is:

1. A system for verifying the identity of a person based on a relationship between anatomic structures of a hand of said person when said person is holding and operating a computer mouse with said hand while in contact with a surface of a touch-sensitive screen of a computer across which said person is moving said computer mouse, said system comprising:

a) a touch-sensitive screen means, coupled to a computer means, for sensing and determining an angular relationship between anatomic structures of a hand of a person when said hand is in contact with a surface of said touch-sensitive screen means and said person is moving a computer mouse, coupled to said computer, across said touch-sensitive screen means while holding said computer mouse in said hand;

b) a comparitor means for comparing said angular relationship between said related anatomic structures of said hand sensed and determined by contact with said surface of said touch-sensitive screen means with a previously established standard for said angular relationship between said anatomic structures of said hand of said person.

2. A system for verifying the identity of a person as in claim 1 wherein said touch-sensitive screen means is a visual display for said computer and said touch-sensitive screen means is coupled to said computer.

3. A system for verifying the identity of a person as in claim 1 wherein said touch-sensitive screen means is coupled to said computer and said touch-sensitive screen means is oriented with a surface of said touch-sensitive screen means in a substantially horizontal position.

4. A system for verifying the identity of a person as in claim 1 wherein said touch-sensitive screen means is coupled to said computer and said touch-sensitive screen means is oriented with a surface thereof in a substantially vertical position.

5. A system for verifying the identity of a person based on a relationship between anatomic structures of a hand of said person when said person is holding and operating a means with said hand while in contact with a surface of a touch-sensitive screen of a computer across which said person is moving said computer mouse, said system comprising:

a) a touch-sensitive screen means, coupled to a computer means, for sensing and determining an angular relationship between anatomic structures of a hand of a person when said hand is in contact with a surface of said touch-sensitive screen means and said person is moving a computer mouse, coupled to said computer, across said touch-sensitive screen means while holding said computer mouse in said hand;

b) a comparitor means for comparing said angular relationship between said related anatomic structures of said hand sensed and determined by contact with said surface of said touch-sensitive screen means with a previously established standard for said angular relationship between said anatomic structures of said hand or said person; and c) a storage means for storing said previously established standard.

6. A system for verifying the identity of a person based on a relationship between anatomic structures of a hand of said person when said person is holding and operating a computer mouse with said hand while in contact with a surface of a touch-sensitive screen of a computer across which said person is moving said computer mouse, said system comprising:

a) a touch-sensitive screen means, coupled to a computer means, for sensing and determining an angular relationship between anatomic structures of a hand of a person when said hand is in contact with a surface of said touch-sensitive screen means and said person is moving a computer mouse, coupled to said computer, across said touch-sensitive screen means while holding said computer mouse in said hand;

b) a comparitor means for comparing said angular relationship between said related anatomic structures of said hand sensed and determined by contact with said surface of said touch-sensitive screen means with a previously established standard for said angular relationship between said anatomic structures of said hand of said person; and c) a data storage means for storing data corresponding to said previously established standard and a data retrieval means for retrieving said data corresponding to said previously established standard from said data storage means.

7. A system for confirming the identity of a person comprising:

a) a first touch-sensitive screen means, coupled to a computer means, said first touch-sensitive screen means for determining a first angular orientation between related anatomic structures of a hand of a first person, said first angular orientation determined during a first act of operating a first computer mouse across a first surface of said first touch-sensitive screen means, when holding said first computer means in said hand of said first person, and a first part of said hand is in contact with said first surface, and for providing a first signal defining said first angular orientation between said related anatomic structures of said hand;

b) a storage means for storing said first signal;

c) a second touch-sensitive screen means, coupled to said computer means, said second touch-sensitive screen means for determining a second angular orientation between related anatomic structures of a hand of a second person, said second angular orientation determined during a second act of operating a second computer mouse across a second surface of said second touch-sensitive screen means, when holding said second computer mouse in said hand of said second person, and a second part of said hand is in contact with said second surface, and for providing a second signal defining said second angular orientation between said related anatomic structures of said hand of said second person;

d) a retrieval means for retrieving said first signal from said storage means; and e) a comparison means for comparing said first signal with said second signal for confirming that said first person and said second person are the same person.

8. A system for confirming identity as in claim 7 and in which said system further includes:

a) a first means for converting said first signal into a digital data defining said first angular orientation; and b) a memory means for storing said digital data.

9. A method for confirming the identity of a person including the steps of:

a) monitoring a first angular relationship between anatomic structures of a hand of a first person when said first person is operating a first computer mouse across a first surface of a first touch-sensitive screen of a first monitor of a first computer while holding said first computer mouse and part of said hand of said first person is in contact with said first surface;

b) generating a first data representing said first angular relationship;

c) storing said first data as a standard for said first person;

d) monitoring a second angular relationship between anatomic structures of a hand of a second person when said second person is operating a second computer mouse across a second surface of a second touch-sensitive screen means of a second monitor of a second computer while holding said second computer mouse and part of said hand of said second person is in contact with said second surface;

e) generating a second data representing said second angular relationship;

f) retrieving said first data from storage; and g) comparing said first data with said second data for confirming that said second person is said first person.

10. A system for verifying the identity of a person based on a comparison of previously and currently determined characteristics between anatomic structures of a hand of a person when said person is holding and operating a computer mouse over a surface and said hand is in contact with said surface, said system comprising:

a) a data storage means for storing a first data, defining a first anatomic relationship between related structures of a hand of a first person, sensed and determined during a previous operation of a first computer mouse by said first person, across a first surface of a first touch-sensitive screen means when said hand of said first person holding said first computer mouse is in contact with said first surface of said first touch-sensitive screen means;

b) a second touch-sensitive screen means, coupled to a computer means, for sensing and determining a second angular relationship between said related anatomic structures of a hand of a second person when said hand is holding a second computer mouse and said second person is operating said second computer mouse across a second surface of said second touch-sensitive screen means and said hand is in contact with said second surface;

c) a means for converting said second angular relationship into a second data defining said second angular relationship; and d) a comparator means for comparing said first data with said second data for verifying that said second person is said first person.

11. A system for verifying the identity of a person based on a comparison of previously and currently determined characteristics between anatomic structures of a hand of a person when said person is holding and operating a computer mouse over a surface and said hand is in contact with said surface, said system comprising:

a) a data storage means for storing a first data, defining a first anatomic relationship between related structures of a hand of a first person, sensed and determined during a previous operation of a first computer mouse by said first person across a first surface of a first touch-sensitive screen means when said hand of said first person holding said first computer mouse is in contact with said first surface of said first touch sensitive screen means, wherein said storage means is a transferrable, programmable memory means;

b) a second touch-sensitive screen means, coupled to a computer means, for sensing and determining a second angular relationship between said related anatomic structures of hand of a second person when said hand is holding a second computer mouse and said second person is operating said second computer mouse across a second surface of said second touch-sensitive screen means and said hand is in contact with said second surface;

c) a means for converting said second angular relationship into a second data defining said second angular relationship;

d) a comparator means for comparing said first data with said second data for verifying that said second person is said first person; and e) an interface means for receiving said transferrable programmable memory means and for reading said first data programmed into said transferrable, programmable memory means and for inputting said first data into said comparator means.

12. A system for verifying the identity of a person based on a comparison of previously and currently determined characteristics between anatomic structures of a hand of a person when said person is holding and operating a computer mouse over a surface and said hand is in contact with said surface, said system comprising:

a) a data storage means for storing a first data, defining a first anatomic relationship between related structures of a hand of a first person, sensed and determined during a previous operation of a first computer mouse by said first person, across a first surface of a first touch-sensitive screen means when said hand of said first person holding said first computer mouse is in contact with said first surface of said first touch sensitive screen means;

b) a second touch-sensitive screen means, coupled to a computer means, for sensing and determining a second angular relationship between said related anatomic structures of hand of a second person when said hand is holding a second computer mouse and said second person is operating said second computer mouse across a second surface of said second touch-sensitive screen means and said hand is in contact with said second surface;

c) a means for converting said second angular relationship into a second data defining said second angular relationship;

d) a comparator means for comparing said first data with said second data for verifying that said second person is said first person; and e) an access control means coupled to said computer means for permitting extended access to said computer means upon verification that said second person is said first person.

* * * * *